(12) United States Patent
Kulkarni et al.

(10) Patent No.: US 7,555,484 B2
(45) Date of Patent: Jun. 30, 2009

(54) LOAD BALANCING BASED ON CACHE CONTENT

(75) Inventors: Sanjay Govindrao Kulkarni, Sammamish, WA (US); Juraj Slugen, Bellevue, WA (US); Terrence Courtney Owen, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 236 days.

(21) Appl. No.: 11/038,312

(22) Filed: Jan. 19, 2005

(65) Prior Publication Data

US 2006/0161577 A1    Jul. 20, 2006

(51) Int. Cl.
*G06F 17/30* (2006.01)
(52) U.S. Cl. .......................................... 707/10; 707/1
(58) Field of Classification Search .................. 707/3, 707/10, 102, 104.1, 1, 200; 709/225; 718/105
See application file for complete search history.

(56) References Cited

U.S. PATENT DOCUMENTS 5,701,400 A * 12/1997 Amado ........................ 706/45
6,963,828 B1 * 11/2005 McDonald et al. ............ 703/22
6,965,895 B2 * 11/2005 Smith et al. ................... 707/10
7,174,379 B2 *  2/2007 Agarwal et al. .............. 709/226
2003/0061352 A1 *  3/2003 Bohrer et al. ................ 709/226
2004/0133634 A1 *  7/2004 Luke et al. ................... 709/203
2004/0230874 A1    11/2004 Prang et al. ................... 714/39
2005/0102400 A1 *  5/2005 Nakahara et al. ............ 709/225
2006/0080388 A1 *  4/2006 Cherkasova et al. ......... 709/203

* cited by examiner

*Primary Examiner*—Cheryl Lewis
(74) *Attorney, Agent, or Firm*—Merchant & Gould, P.C.

(57) ABSTRACT

A method, schema, and computer-readable medium provide various means for load balancing computing devices in a multi-server environment. The method, schema, and computer-readable medium for load balancing computing devices in a multi-server environment may be utilized in a networked server environment, implementing a spreadsheet application for manipulating a workbook, for example. The method, schema, and computer-readable medium operate to load balance computing devices in a multi-server environment including determining whether a file, such as a spreadsheet application workbook, resides in the cache of a particular server, such as a calculation server. Upon meeting certain conditions, the user request may be directed to the particular server.

17 Claims, 5 Drawing Sheets

LOAD BALANCING BASED ON CACHE CONTENT

BACKGROUND OF THE INVENTION

Load balancing functionality can be essential when distributing processes among multiple servers in a farm of servers. Load balancing provides a mechanism to scale out an application or applications to multiple computing machines. However, hardware-based load balancing mechanisms lack the ability to load balance servers implementing an application when requests need to be directed to an appropriate server. Additionally, simple round robin load balancing schemes result in the same data/document being loaded on multiple servers, tending to be inefficient and inelegant solutions for many situations. Moreover, prior load balancing schemes typically do not determine whether a file is already loaded on a server in a multi-server environment. That is, prior load balancing schemes do not consider the data cached on an individual server when balancing load across multiple computing machines in a farm. Thus, when a user requests a file, the file may be reloaded on a different server, thereby incurring a penalty in terms of time, memory, speed, etc., due to reloading the document again.

Accordingly, what is needed is a load balancing scheme which directs requests to appropriate servers, thereby providing improved performance and a better user experience.

BRIEF SUMMARY OF THE INVENTION

In accordance with the present invention, the above and other problems are solved by a method, schema, and computer-readable medium which provide means for load balancing computing devices in a multi-server environment. The method, schema, and computer-readable medium for load balancing computing devices in a multi-server environment may be utilized in a networked server environment, implementing a spreadsheet application for manipulating a workbook, for example. The method, schema, and computer-readable medium operate to load balance computing devices in a multi-server environment including determining whether a file, such as a spreadsheet application workbook for example, resides in the cache of a particular server, such as a calculation server for example. Upon meeting certain conditions, the user request may be directed to the particular server.

The invention may be implemented as a computer process, a computing apparatus, or as an article of manufacture such as a computer program product, data structure, or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

These and various other features, as well as advantages, which characterize the present invention, will be apparent from a reading of the following detailed description and a review of the associated drawings.

DETAILED DESCRIPTION OF THE INVENTION

Referring now to the drawings, in which like numerals represent like elements, various aspects of the present invention will be described. In particular, FIG. 1 and the corresponding discussion are intended to provide a brief, general description of a suitable computing environment in which embodiments of the invention may be implemented. While the invention will be described in the general context of program modules that execute in conjunction with program modules that run on an operating system on a personal computer, those skilled in the art will recognize that the invention may also be implemented in combination with other types of computer systems and program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Figure 1:
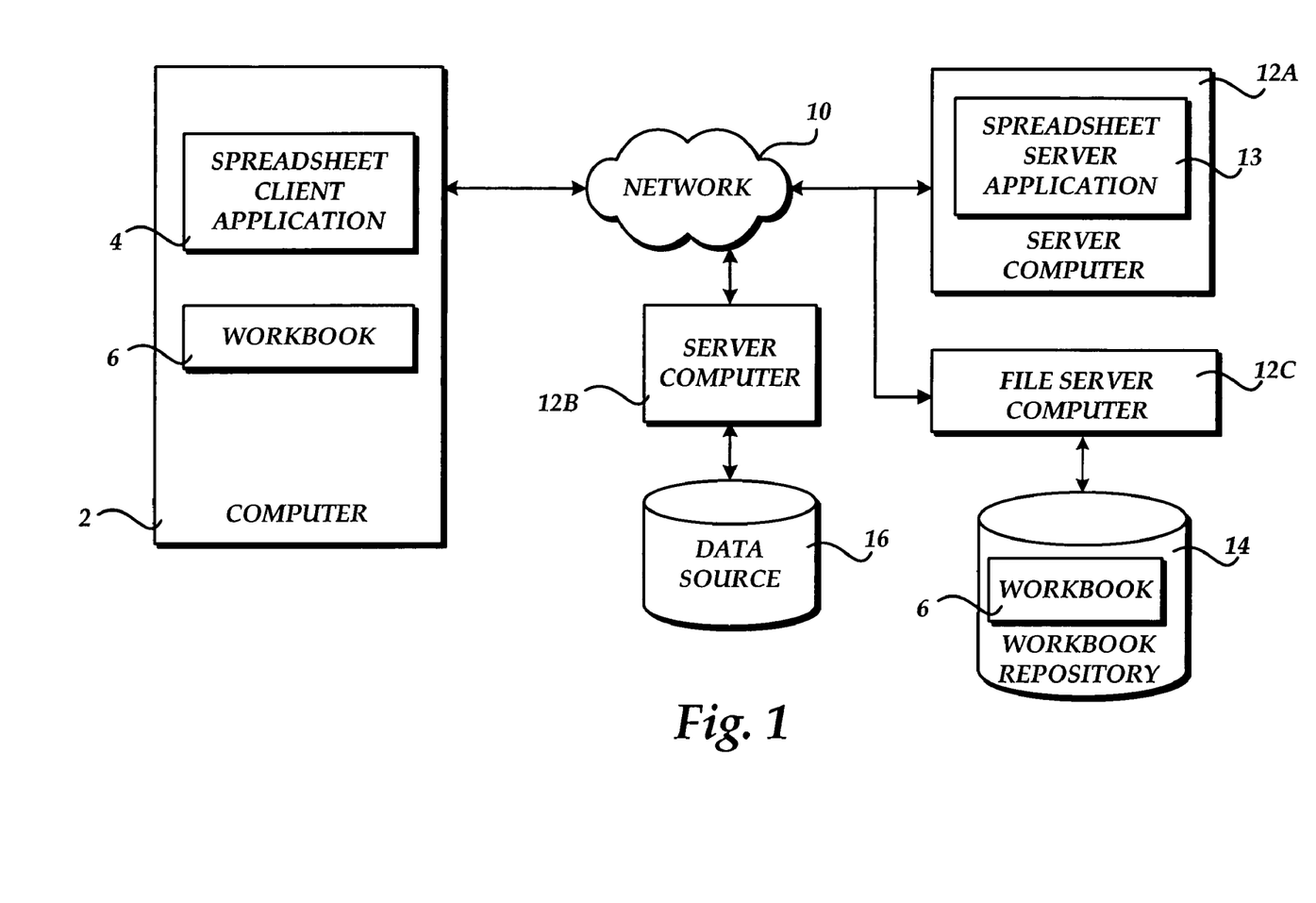
FIG. 1 is a computer network diagram illustrating aspects of several computer systems utilized in and provided by embodiments of the invention.

Referring now to FIG. 1, an illustrative operating environment for the several embodiments of the invention will be described. As shown in FIG. 1, a network 10 interconnects a client computer 2 and several server computers 12A-12C. It should be appreciated that the network 10 may comprise any type of computing network, including a local area network or a wide area network, such as the Internet, and may include more or less computer systems, as described below. The network 10 provides a medium for enabling communication between the client computer 2, the server computers 12A-12C, and potentially other computer systems connected to or accessible through the network 10.

The client computer 2 comprises a general purpose desktop or laptop computer capable of executing one or more application programs. In particular, according to the various embodiments of the invention, the computer 2 is operative to execute a spreadsheet client application 4. As known to those skilled in the art, the spreadsheet client application program 4 provides functionality for creating budgets, performing financial forecasting, and other finance and numeric-related tasks. In order to provide this functionality, data values may be organized using cells and the relationships between the cells may be defined using formulas. A change to one cell produces changes to related cells. Spreadsheet programs usually provide graphing capabilities for output and a variety of formatting options for text, numeric values, and graph features.

According to embodiments of the invention, the spreadsheet client application 4 may be utilized to create a workbook 6. The workbook 6 is a file that is created by a spreadsheet program that contains one or more worksheets (a worksheet may also be referred to herein as a "spreadsheet"). A worksheet is a single page organized into rows and columns within the spreadsheet program and appearing on screen and used for constructing a single table. Worksheets within the workbook 6 may include one or more ranges that include data objects. As defined herein, a data object includes any object within a worksheet that is utilized to store data. For instance, data objects may include, but are not limited to, an arbitrary range of cells, pivot tables, DOEs, lists, databases, and query tables.

According to one embodiment of the invention, the spreadsheet client application 4 comprises the EXCEL spreadsheet application program from MICROSOFT CORPORATION of Redmond, Wash. It should be appreciated, however, that the various aspects of the invention described herein may be utilized with other spreadsheet application programs from other manufacturers. Moreover, although the inventive aspects described herein are presented in the context of a spreadsheet application program, it should be appreciated that other types of application programs may also be utilized to embody the various aspects of the invention.

The spreadsheet client application 4 may publish the workbook 6 to a repository 14 maintained by a file server computer 12C and accessible to the server computer 12A. The spreadsheet server application 13 executing on the server computer 12A may then parse the workbook 6 and expose the contents of the workbook 6 as a server data source. It should be appreciated that the spreadsheet client application 4 may act as a consumer of data from a data source. It should also be appreciated that the computer 2 may be operative to execute additional client applications for querying and consuming data from other types of databases. It should further be appreciated that in an alternative embodiment, the functions of the computer 2 described above may be divided among two or more computing devices. For instance, one computing device may be operative to execute the spreadsheet application 4 for publishing the workbook 6 while another computing device may be operative to execute client applications for consuming data. As used herein, the terms "data source" and "server data source" refer specifically to a database upon which queries may be executed.

The spreadsheet server application 13 comprises a server-based application program that may execute without the use of a display screen (headless). The spreadsheet server application 13 is operative to perform many of the functions of the spreadsheet client application 4 on a server computer. For instance, the spreadsheet server application 13 can load and calculate a workbook 6. As will be described herein, the spreadsheet server application 13 also provides functionality for exposing a workbook 6 as a data source to compatible clients via the network 10.

Figure 2:
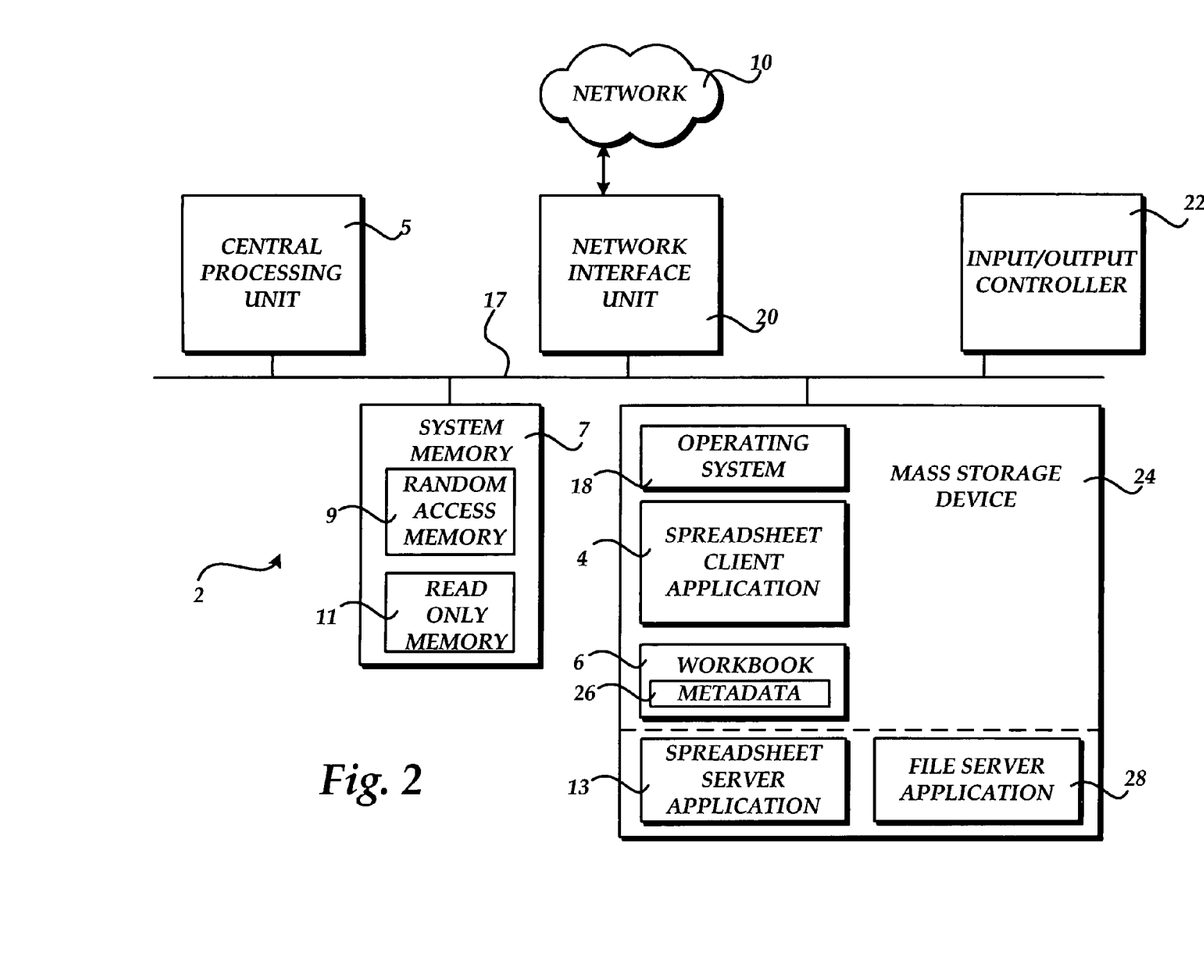
FIG. 2 is a computer system architecture diagram illustrating aspects of a client computer system utilized in and provided by embodiments of the invention.

Referring now to FIG. 2, an illustrative computer architecture for a computer 2 utilized in the various embodiments of the invention will be described. The computer architecture shown in FIG. 2 illustrates a conventional desktop or laptop computer, including a central processing unit 5 ("CPU"), a system memory 7, including a random access memory 9 ("RAM") and a read-only memory ("ROM") 11, and a system bus 17 that couples the memory to the CPU 5. A basic input/output system containing the basic routines that help to transfer information between elements within the computer, such as during startup, is stored in the ROM 11. The computer 2 further includes a mass storage device 24 for storing an operating system 18, application programs, and other program modules.

The mass storage device 24 is connected to the CPU 5 through a mass storage controller (not shown) connected to the bus 17. The mass storage device 24 and its associated computer-readable media provide non-volatile storage for the computer 2. Although the description of computer-readable media contained herein refers to a mass storage device, such as a hard disk or CD-ROM drive, it should be appreciated by those skilled in the art that computer-readable media can be any available media that can be accessed by the computer 2.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 2.

According to various embodiments of the invention, the computer 2 may operate in a networked environment using logical connections to remote computers through a network 10, such as the Internet. The computer 2 may connect to the network 10 through a network interface unit 20 connected to the bus 17. It should be appreciated that the network interface unit 20 may also be utilized to connect to other types of networks and remote computer systems. The computer 2 may also include an input/output controller 22 for receiving and processing input from a number of other devices, including a keyboard, mouse, or electronic stylus (not shown in FIG. 2). Similarly, an input/output controller 22 may provide output to a display screen, a printer, or other type of output device.

As mentioned briefly above, a number of program modules and data files may be stored in the mass storage device 24 and RAM 9 of the computer 2, including an operating system 18 suitable for controlling the operation of a networked personal computer, such as the WINDOWS XP operating system from MICROSOFT CORPORATION of Redmond, Wash. The mass storage device 24 and RAM 9 may also store one or more program modules. In particular, the mass storage device 24 and the RAM 9 may store a spreadsheet client application 4, as described above. The mass storage device 24 and RAM 9 may also store a workbook 6 created by the spreadsheet client application 4.

According to one embodiment of the invention, the spreadsheet application program 4 is also operative to generate metadata 26 for the workbook 6. The metadata 26 may be predefined to describe the structure of the workbook, such as the rows, columns, and sheets of the workbook. The metadata 26 may be stored within the workbook 6 and saved with the workbook. The metadata 26 may be utilized by the server computer 12A when receiving and responding to requests to access the workbook 6 as a server data source. It should be appreciated that, in embodiments of the invention, the spreadsheet client application program 4 is operative to provide a facility for allowing a user to edit the metadata 26 created by the spreadsheet application program 4 for the data objects contained in a workbook 6.

It should be appreciated that the server computers 12A-12C may include many of the conventional computing components illustrated in FIG. 2 and described above. Additionally, the server computer 12A may be operative to store and execute a spreadsheet server application 13. The file server computer 12C may be operative to store and execute a file server application 28 for receiving and responding to requests for files stored in the repository 14, such as a workbook 6. It should be appreciated that the server computers 12A-12C may include other conventional components not illustrated in FIG. 2 but known to those skilled in the art.

Figure 3:
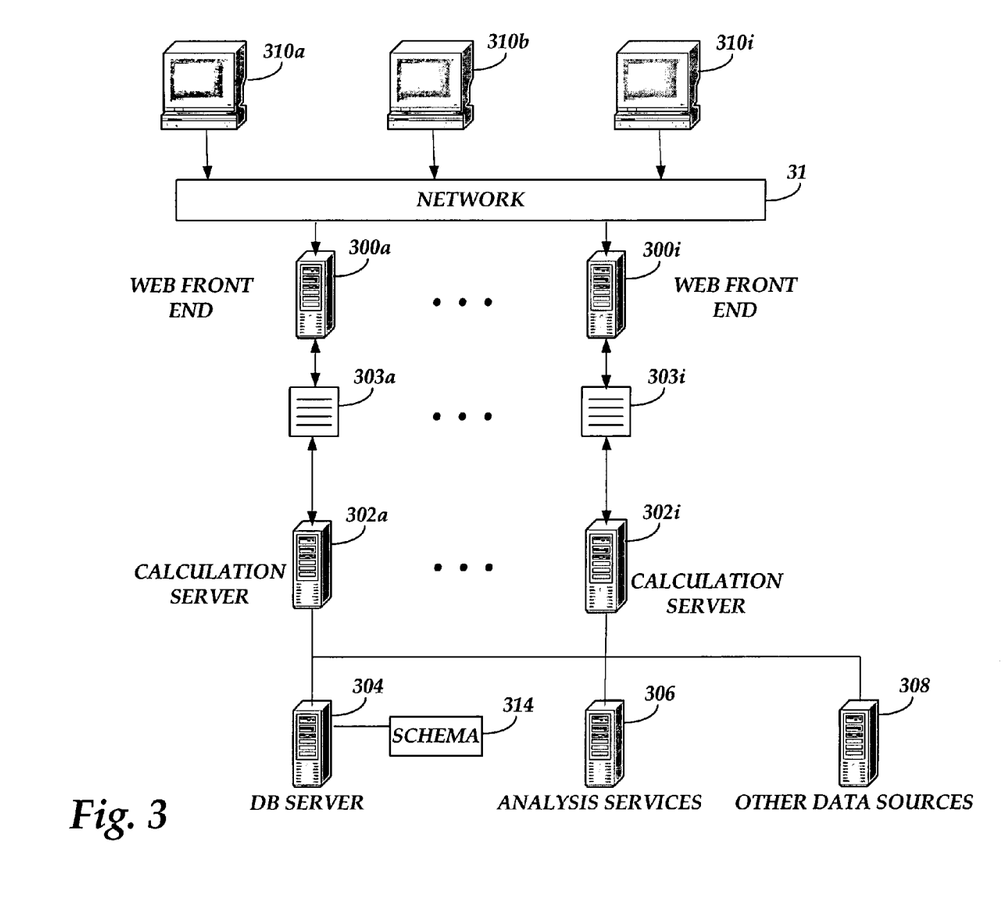
FIG. 3 is a computer network diagram illustrating aspects of several computer systems utilized in and provided by embodiments of the invention.

Referring now to FIG. 3, an embodiment of the invention is described. As shown in FIG. 3, a server farm includes a plurality of web front end (WFE) servers 300a-300i, where i is greater than 1. For this embodiment, it is preferred that each WFE server 300a-300i include a plurality of programs. For example, each WFE server may include MICROSOFT WINDOWS SHAREPOINT SERVER (WSS), EXCEL SERVER, and/or EXCEL SERVER API. A plurality of calculation servers 302a-302i and application servers 303a-303i (analogous to application server 12A, described above), are in communication with the plurality of WFE servers 300a-300i. As described further below, each calculation server 302a-302i is operable to open spreadsheets, recalculate and refresh associated data/information, render any part of a spreadsheet, and to perform many other operations on one or more spreadsheets.

In preferred embodiments of the invention, each of the calculation servers 302a-302i is assigned a unique identification number (ECSID), as described below. It will be appreciated that communication between computers may be wireline, wireless or a combination of both. It will also be appreciated that the functions of a WFE and calculation server may be combined and presented on one server. That is, the functionality of the plurality of WFE servers 300a-300i and calculation servers 302a-302i can be combined to a plurality of servers, effectively cutting the number of server computers in half. It will be further appreciated that the server computers may include many of the conventional computing components illustrated in FIG. 2 and described above. Additionally, the server computers may be operative to store and execute a spreadsheet server application, such as spreadsheet server application 13, and receive and/or respond to requests for files, such as workbook 6, stored in a repository, such as repository 14, described above.

As shown in FIG. 3, each server of the plurality of calculation servers 302a-302i is in communication with a database server 304, such as MICROSOFT SQL SERVER, an analysis services server 306, and other data sources 308. The plurality of calculation servers 302a-302i are also in communication with one or more application server computers, similar to server computer 12A. One or more client computers 310a-310i are in communication, such as over a network 312 for example, with the plurality of WFE servers 300a-300i. The WFE servers 300a-300i also include functionality to protect the calculation and application servers, by concealing their identities from an external user or unauthorized access.

The one or more WFE servers 300a-300i also operate to authenticate one or more users before making a request to one or more of the calculation servers 302a-302i on behalf of a user request, and performs rendering depending on the type and browser being used by a user. In a preferred embodiment, each WFE Server includes a component, herein termed a calculation server proxy, which implements the load balancing scheme (eg. routine 400 described below). Preferably, the calculation server proxy is included in one or more of the WFE servers 300a-300i. The calculation server proxy operates to isolate components of a WFE server from the internal implementation of the load balancing method. It is also preferable that the one or more WFE servers 300a-300i include other features which operate to forward requests to the calculation server proxy which in turn takes care of routing the request to the appropriate calculation server.

Figure 4:
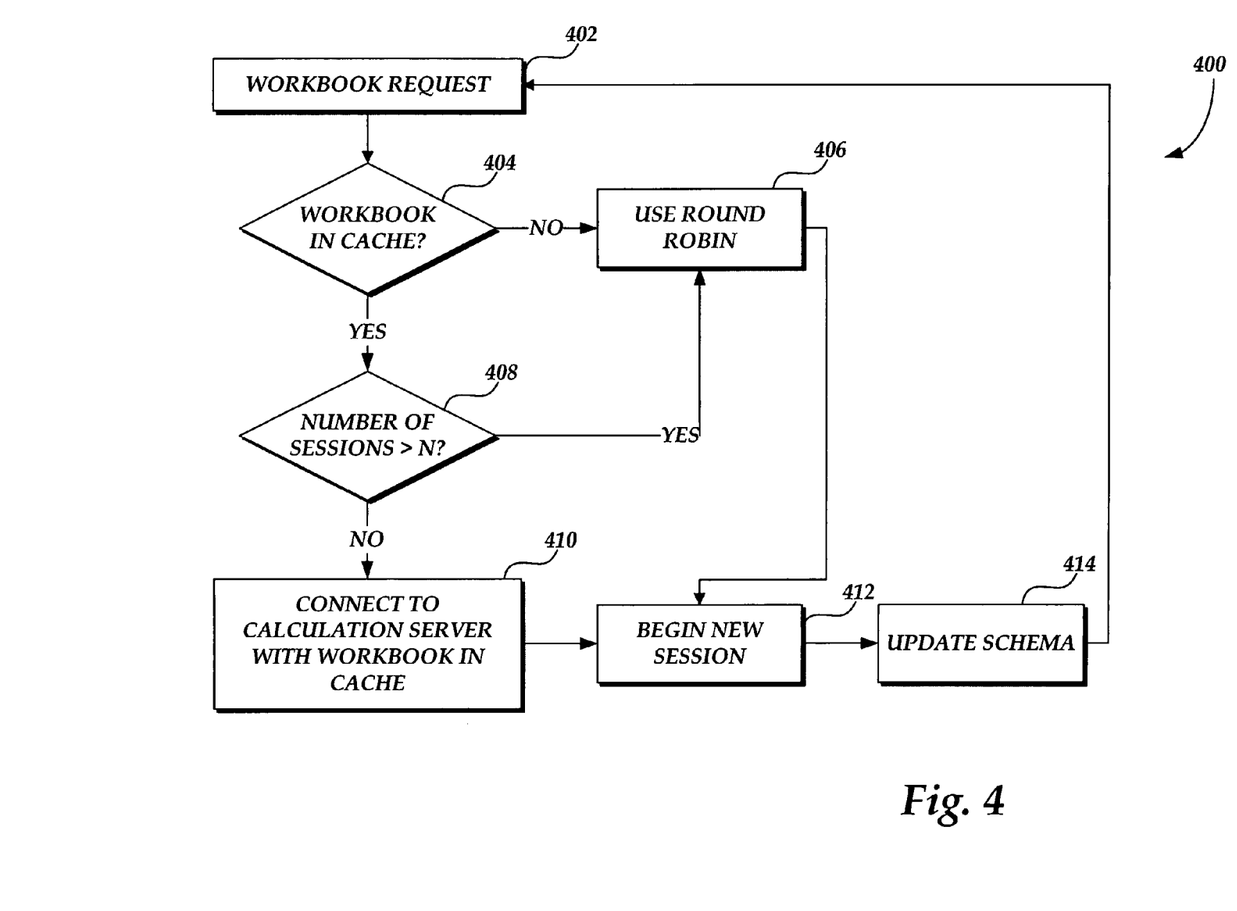
FIG. 4 is a flow diagram illustrating a routine for load balancing servers in a computer network according to an embodiment of the invention.

With additional reference to FIG. 4 typically, a user types in a file request into a browser for a particular file of interest. Based on the routine 400, one of the calculation servers 302a-302i can process the request, generate XML output, and send the XML output to one of the WFE servers 300a-300i. The particular WFE server converts the XML to HTML and sends the HTML the user's browser. The user does not actually know which server the request went to. The user issued an HTTP request and is now able to use the requested file.

According to the invention, load balancing is utilized to balance the load among calculation servers 302a-302i when users of client computers 310a-310i utilize services of one or more of the calculation servers 302a-302i, including file requests. According to one embodiment of the invention, a load balancing technique utilizes cache content of the plurality of calculation servers 302a-302i the farm. Based on certain criteria, described below, requests may then be directed to one of the calculation servers 302a-302i which may already include a file, such as a workbook 6, in its cache. Preferably, a schema 314, implemented on the database server 304, is used to monitor events associated with a workbook 6. Most preferably, the schema is used to detect if the workbook 6 is already loaded on a particular calculation server 302a-302i. The table below includes the schema properties with the associated description and types for a most preferred embodiment of the invention.

TABLE

| Property | Description | Type |
| --- | --- | --- |
| ECSID | Id of the calculation server with a requested workbook | String |
| Workbook URL | Workbook URL | String |
| Number of Sessions | Number of Sessions open with this workbook URL on this calculation server | Integer |

The preferred schema is indexed on ECSID and Workbook URL. Furthermore, as used herein, "session" refers to a period of time that a file, such as a workbook 6 is open.

Referring now to FIG. 4, an exemplary routine 400 is depicted, illustrating a process for load balancing in a multi-server environment with respect to a spreadsheet application 4 and 13, for creating, using, and maintaining workbooks 6. When reading the discussion of the routines presented herein, it should be appreciated that the logical operations of various embodiments of the present invention are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims set forth herein.

The exemplary routine 400 begins at operation 402 when one or more users, using client computers 310a-310i request a workbook 6 across the network 312 by entering a targeted query (HTTP) into a browser running on one or more of the client computers 310a-310i. The WFEs 300a-300i and associated application servers 303a-303i, operate to open spreadsheet files, such as a workbook 6, and render the workbook 6 to one or more of the client computers 310a-310i. At operation 404, the routine 400 checks the schema 314 to determine if the requested workbook 6 resides in the cache of one of the calculation server 302a-302i. If the requested workbook 6 is not in the cache of one of the calculation servers 302a-302i, a round-robin scheme is implemented at operation 406 to load the requested workbook 6 on a particular calculation server 302a-302i. In a preferred embodiment, the round-robin scheme assumes that a spreadsheet is loaded from a common storage location of each of the plurality of calculation servers 302a-302i. For example, using a "round robin" scheme in a three calculation server 302a-302c farm, the routine 400 utilizes each server in a circular sequential manner. That is, the routine 400 proceeds first to the first calculation server 302a, then to the second calculation server 302b, and next to the third calculation server 302c, etc. It will be appreciated that if a requested workbook is not in the cache of one of the calculation servers 302a-302i, the number of sessions will equal zero until a requested workbook 6 is loaded onto one of the calculation servers 302a-302i, which begins a new session (operation 412).

If the routine 400 determines that the requested workbook 6 is available in the cache of one of the calculation servers 302a-302i, the routine 400 proceeds to operation 408, and using the schema 314, determines whether the number of sessions is greater than a predefined number, one hundred sessions, for example. It will be appreciated that the predefined number may be configurable by an administrator of the network 312. If the number of sessions is greater than the predefined number, the routine 400 proceeds to operation 406, implementing round robin progression. If the number of sessions is less than or equal to the predefined number, the routine 400 proceeds to operation 410, connecting to the calculation server having the requested workbook in its cache. Thus, the routine operates, under certain conditions, to direct a particular request to a particular calculation server, operating to improve the overall response time of the multi-server environment. The workbook 6 refreshes when connected to the calculation server via one of the WFEs 300a-300i and one of the application servers 303a-303i, thereby displaying workbook data in the user's browser. A user using workbook 6, via communication between the application servers 303a-303i and the DB server 304, can exploit data stored in the DB server 304.

At operation 412, a new session associated with the workbook 6 begins on an associated calculation server 302a-302i and the schema is updated at 414 by adding entries to the schema 314 (see Table above) on DB server 304 setting the number of sessions to one, incrementing or decrementing the number of sessions, according to the particular scenario. For example, if the number of sessions is equal to ninety, once a new session begins, the routine 400 increments the number of sessions in the schema 314 to ninety-one. Correspondingly, when a user closes the workbook 6 or logs off the client computer, the routine 400 decrements the number of sessions in the schema 314 accordingly. Thus, the routine 400 tracks the workbook 6 being used and initially it sets the number of sessions for a particular workbook to one. If the same workbook 6 is requested by another user, the schema increments the number of sessions alerting the routine 400 that this is the same workbook updating the associated number of sessions. If the number of sessions reaches zero the particular workbook is not being used.

As described above, the schema 314 includes the uniform resource locator (URL) identifying a particular workbook 6 as well as the ID (ECSID) identifying the particular calculation server whose cache contains a particular workbook 6. The schema 314 tracks which workbooks 6 are stored on which calculation servers 302a-302i. Additionally, each time a workbook is opened on a calculation server 302a-302i, that particular calculation server sends information to the DB server 304, including information to update the schema 314. In a preferred embodiment, the particular calculation server sends the workbook URL and the calculation server ID to the DB server 304.

Figure 5:
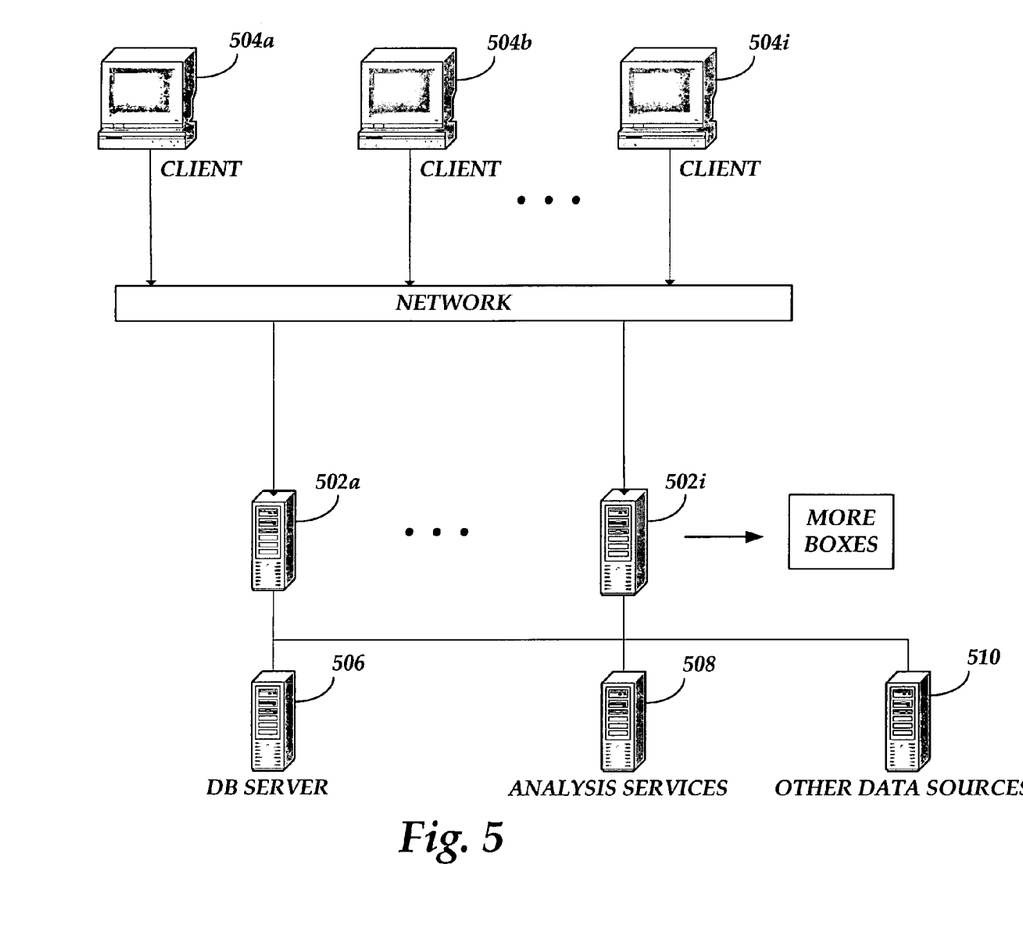
FIG. 5 is a computer network diagram illustrating aspects of several computer systems utilized in and provided by an embodiment of the invention.

Another embodiment of the invention is shown in FIG. 5, where the functionality of the WFE, calculation, and application servers are combined in one server computer, the server farm including a plurality of such servers 502a-502i. The computer network includes one or more client computers 504a-504i, a DB server 506, analysis services 508, and other data sources 510. A user or administrator may install the calculation server module, web front end module, application server module, and/or DB server module on the same machine. The modules may exist on the same machine or on different machines, depending on how much load there is or is projected to be on the server farm. Thus, for large organizations, the modules may be installed on separate machines. Whereas in a small organization they may be installed on the same machine.

It will be appreciated that the above-described routine 400 can be implemented in other server environments as well for many other types of applications. The above specification, examples and data provide a complete description of the manufacture and use of the composition of the invention. Since many embodiments of the invention can be made without departing from the spirit and scope of the invention, the invention resides in the claims hereinafter appended.

We claim:

1. A method of load-balancing across servers in a multi-server server environment, the method comprising:
   receiving a request for a workbook, the workbook located on a server;
   determining if the workbook is available on at least one of the servers in the multi-server environment by analyzing a schema including a property, the property indicating a number of currently open user sessions for the workbook on the server and when the workbook is loaded on the server; and when it is determined that the workbook is available on the server, performing actions, including:
      determining the number of currently open user sessions for the workbook on the server,
      determining a load on the server by comparing the number of currently open user sessions for the workbook on the server to a predefined number,
      directing the request for the workbook to the server hosting the workbook when the number of currently open user sessions for the workbook on the server is less than a predefined number; otherwise, when the number of currently open user sessions for the workbook on the server is not less than the predefined number or when the workbook is not available on the server, the directing the request for the workbook to one of the servers using a load balancing mechanism;

updating the property in the schema to correspond to the number of currently open user sessions for the workbook on the server; and storing the updated schema.

2. The method of claim 1, further comprising directing the request to the server hosting the workbook if the number of currently open user sessions is less than one hundred.

3. The method of claim 1, further comprising analyzing cache content of a spreadsheet application server.

4. The method of claim 1, further comprising tracking the server containing the requested workbook.

5. The method of claim 4, further comprising using the schema to track the server containing the requested workbook.

6. The method of claim 5, wherein the schema includes a first element associated with a server identification, a second element associated with a uniform resource locator (URL) corresponding to the workbook, and a third element associated with the number of currently open user sessions associated with the workbook.

7. The method of claim 1, further comprising incrementing a variable representing the number of currently open user sessions upon opening a new session.

8. The method of claim 1, further comprising decrementing a variable representing the number of currently open user sessions when the workbook is closed or time out.

9. The method of claim 1, further comprising delineating a session when the workbook is opened on or requested from a spreadsheet application server.

10. A computer-readable storage medium having computer-executable instructions which, when executed by a computer, cause the computer to perform the method of claim 1.

11. A computer-readable storage medium having computer-executable instructions which, when executed by a computer, cause the computer to perform a method for load balancing servers in a multi-server environment, the method comprising:

associating a schema with servers in the multi-server environment; wherein the schema comprises a number of currently open user sessions variable indicating when a workbook is loaded on a server and a number of currently open user sessions that are currently accessing the workbook on the server, a server identification, and a uniform resource locator (URL corresponding to the workbook;

determining if the workbook is available on a server in the multi-server environment by analyzing the schema that includes the number of currently open user sessions variable;

requisitioning the workbook from the server when the number of currently open user sessions variable is less than a predefined number based on analyzing the schema; otherwise when the number of currently open user sessions variable is not less than the predefined number: requisitioning the workbook from one of the severs selected using a load balancing mechanism;

updating the schema to correspond to the number of currently open user sessions for the workbook on the server; and storing the updated schema.

12. The computer-readable storage medium of claim 11, the method further comprising implementing the schema on a database server associated with the multi-server environment.

13. The computer-readable storage medium of claim 11, the method further comprising using a round-robin scheme to provision a server when the number of currently open user sessions associated with the workbook is greater than the predefined number.

14. The computer-readable storage medium of claim 11, the method further comprising using a round-robin scheme to provision a server when the workbook is first opened or the number of currently open user sessions is zero.

15. A schema stored on a computer-readable storage medium for use in provisioning servers in a multi-server environment, the schema comprising:

a first element corresponding to an identification of a server in the multi-server environment, a second element corresponding to a uniform resource locator (URL) indicating the location of a server in the multi-server environment in which a requested workbook is stored, and a third element corresponding to a number of current user sessions associated with the requested workbook on a spreadsheet application server; wherein the number of current user sessions indicates a number of user sessions that are currently accessing the requested workbook on the server.

16. The schema of claim 15, wherein the first element corresponds to an identification of a spreadsheet calculation server.

17. The schema of claim 15, wherein the second element corresponds to a workbook associated with a spreadsheet application.

* * * * *